(12) United States Patent
Wu et al.

(10) Patent No.: US 10,719,136 B2
(45) Date of Patent: Jul. 21, 2020

(54) RESILIENT ELEMENT AND KEYBOARD STRUCTURE

(71) Applicants: CHICONY ELECTRONICS CO., LTD., New Taipei (TW); FUJITSU CLIENT COMPUTING LIMITED, Kanagawa (JP)

(72) Inventors: Fei-Wu Wu, New Taipei (TW); Pin-Fan Chuang, New Taipei (TW); Hideyuki Fujikawa, Kanawaga (JP); Naoshige Nishiyama, Kanawaga (JP)

(73) Assignees: CHICONY ELECTRONICS CO., LTD., New Taipei (TW); FUJITSU CLIENT COMPUTING LIMITED, Kanagawa (JP)

( * ) Notice: Subject to any disclaimer, the term of this patent is extended or adjusted under 35 U.S.C. 154(b) by 21 days.

(21) Appl. No.: 16/016,275

(22) Filed: Jun. 22, 2018

(65) Prior Publication Data
US 2019/0187805 A1    Jun. 20, 2019

Related U.S. Application Data

(60) Provisional application No. 62/599,074, filed on Dec. 15, 2017.

(51) Int. Cl.
*G06F 3/02* (2006.01)
*H01H 3/12* (2006.01)

(52) U.S. Cl.
CPC ............. *G06F 3/0202* (2013.01); *H01H 3/12* (2013.01)

(58) Field of Classification Search
CPC ....................................................... G06F 3/202
See application file for complete search history.

(56) References Cited

U.S. PATENT DOCUMENTS

| | | | | |
|---|---|---|---|---|
| 5,389,757 A * | 2/1995 | Souliere | ............... | H01H 13/705 200/345 |
| 5,565,865 A * | 10/1996 | So | ......... | G06F 3/0202 200/344 |
| 5,763,842 A * | 6/1998 | Tsai | ....... | H01H 3/125 200/343 |
| 5,770,824 A * | 6/1998 | Tsai | ....... | H01H 3/125 200/344 |
| 5,794,762 A * | 8/1998 | Tsai | ...... | H01H 13/705 200/345 |
| 6,259,434 B1 * | 7/2001 | Tsai | ...... | H01H 13/702 200/243 |
| 8,206,047 B1 * | 6/2012 | Isaac | ................... | G06F 3/04886 400/472 |

(Continued)

FOREIGN PATENT DOCUMENTS

| | | |
|---|---|---|
| CN | 1334577 A | 2/2002 |
| CN | 205542524 U | 8/2016 |

(Continued)

*Primary Examiner* — Ibrahim A Khan
(74) *Attorney, Agent, or Firm* — Muncy, Geissler, Olds & Lowe, P.C.

(57) ABSTRACT

A resilient element and a keyboard structure are disclosed. The resilient element has a top surface, a dent portion and a conducting post. The dent portion is located on the top surface and has an accommodating space. The conducting post has a post volume and is located beneath the dent portion. When the conducting post is pressed, at least a portion of the post volume enters the accommodating space.

18 Claims, 4 Drawing Sheets

(56) References Cited

U.S. PATENT DOCUMENTS

| | | | |
|---|---|---|---|
| 10,204,754 B1* | 2/2019 | Chen | H01H 13/85 |
| 2007/0084702 A1* | 4/2007 | Lin | H01H 13/063 |
| | | | 200/5 A |
| 2009/0148219 A1* | 6/2009 | Odell | B29C 45/006 |
| | | | 400/491 |
| 2009/0262492 A1* | 10/2009 | Whitchurch | G06F 3/0202 |
| | | | 361/679.08 |
| 2010/0097246 A1* | 4/2010 | Watanabe | G06F 3/0202 |
| | | | 341/22 |
| 2010/0117967 A1* | 5/2010 | Wang | G06F 1/1662 |
| | | | 345/168 |
| 2010/0213044 A1* | 8/2010 | Strittmatter | H01H 13/702 |
| | | | 200/515 |
| 2011/0056818 A1* | 3/2011 | Maruyama | H01H 13/705 |
| | | | 200/5 A |
| 2012/0181155 A1* | 7/2012 | Iwamoto | H01H 3/125 |
| | | | 200/341 |
| 2018/0068808 A1* | 3/2018 | Wang | G06F 1/1656 |

FOREIGN PATENT DOCUMENTS

| | | |
|---|---|---|
| CN | 206148325 U | 5/2017 |
| TW | 194193 | 11/1992 |
| TW | M-461827 U | 9/2013 |

\* cited by examiner

RESILIENT ELEMENT AND KEYBOARD STRUCTURE

BACKGROUND OF THE INVENTION

1. Field of the Invention

The present invention relates to a resilient element and keyboard structure, particularly to a resilient element that can produce a soft landing effect after the key contact point.

2. Description of the Related Art

With advancements in technology, desktop and notebook computers have become indispensable tools for many people. The physical keyboard is the main input device for desktop or notebook computers. Modern people are accustomed to using the computer for a long time whether they are at work or at leisure. If the percussive feel of the physical keyboard is not good, it may cause fatigue in the fingers, and the keyboard input speed cannot match with the receiving speed of system. Thus, there is still room for improvement. Accordingly, it is necessary to provide a resilient element with a comfortable feel and a keyboard structure to solve the existing problems.

SUMMARY OF THE INVENTION

It is a major objective of the present invention to provide a resilient element that can produce a soft landing effect after the key contact point.

It is another major objective of the present invention to provide a keyboard structure capable of producing a soft landing effect after the key contact point.

To achieve the above objective, a resilient element of the present invention includes a top surface, a dent portion, and a conducting post. The dent portion, which is located on the top surface, includes an accommodating space. The conducting post, which is located beneath the dent portion, has a post volume. When the resilient element is pressed, at least a portion of the post volume enters the accommodating space.

The present invention further provides a keyboard structure, which includes a key cap, a resilient element as described above, and a base plate, wherein the resilient element is located between the key cap and the base plate.

The resilient element and the keyboard structure of the present invention and the accommodating space of the dent portion are designed such that when the resilient element is pressed, at least a portion of the post volume can enter the accommodating space such that a recovery stroke of the resilient element after the contact point produces a soft landing effect, thereby providing the user with a comfortable percussion feel.

DETAILED DESCRIPTION OF THE PREFERRED EMBODIMENT

Hereafter, the technical content of the present invention will be better understood with reference to preferred embodiments. Please refer to FIG. 1A and FIG. 1B, and to FIG. 2 to FIG. 4, which illustrate a cross-sectional view of a keyboard structure according to an embodiment of the present invention, a schematic diagram of a resilient element according to an embodiment of the present invention, a cross-sectional view of a resilient element according to an embodiment of the present invention, a cross-sectional view showing a resilient element deformed by an external force according to an embodiment of the present invention, and an external force curve of a resilient element of the present invention.

Figure 1A:
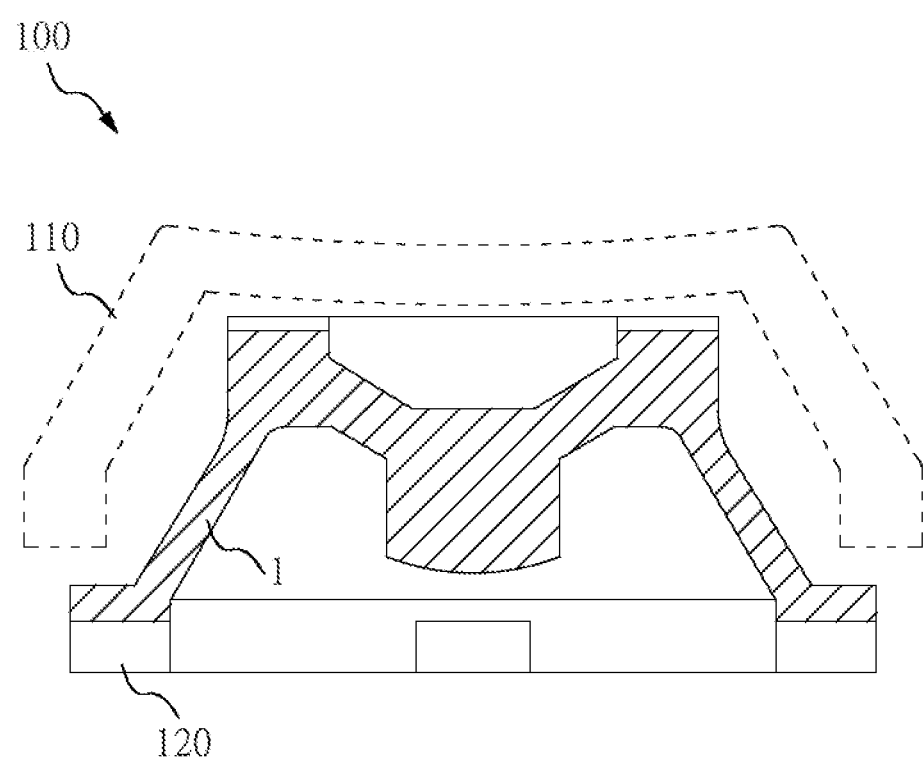
FIG. 1A is a cross-sectional view of a keyboard structure according to an embodiment of the present invention.
Figure 1B:
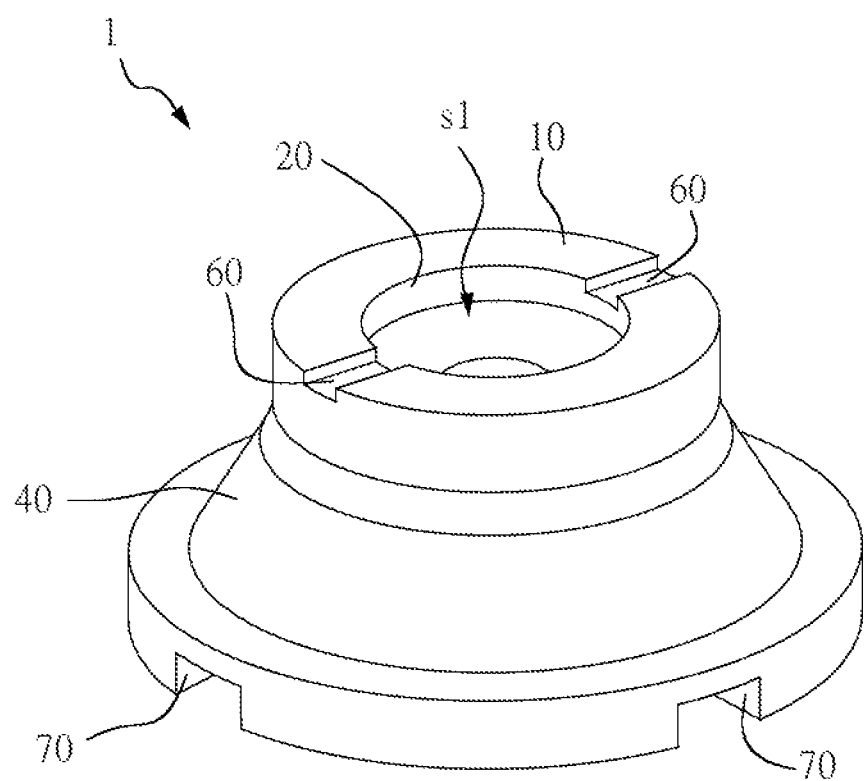
FIG. 1B is a schematic diagram of a resilient element according to an embodiment of the present invention.
Figure 2:
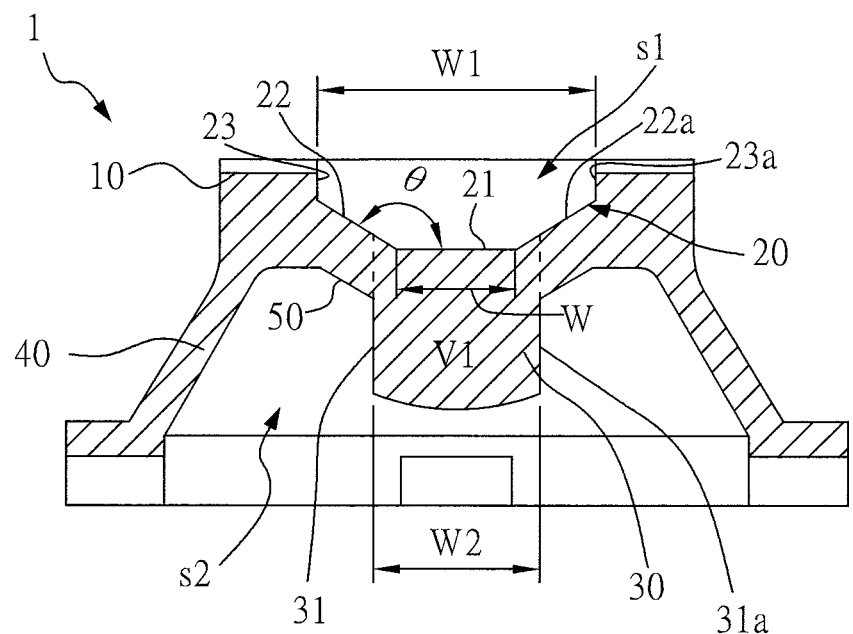
FIG. 2 is a cross-sectional view of a resilient element according to an embodiment of the present invention.

According to an embodiment of the present invention, as shown in FIG. 1A, the keyboard structure 100 of the present invention includes a key cap 110, a resilient element 1, and a base plate 120, wherein the resilient element 1 is located between the key cap 110 and the base plate 120. In the present embodiment, as shown in FIG. 1A, FIG. 1B, and FIG. 2, the resilient element 1 includes a top surface 10, a dent portion 20, a conducting post 30, a side wall 40, and a first inclined surface 50, wherein the top surface 10 is a surface of the resilient element 1 adjacent to the key cap 110. The dent portion 20 is located on the top surface 10 and has an accommodating space s1. The conducting post 30 is located beneath the dent portion 20 in the accommodating space s2 formed by the top surface 10 and the side wall 40. The first inclined surface 50 is also located in the accommodating space s2 and is located between the conducting post 30 and the side wall 40.

Figure 3:
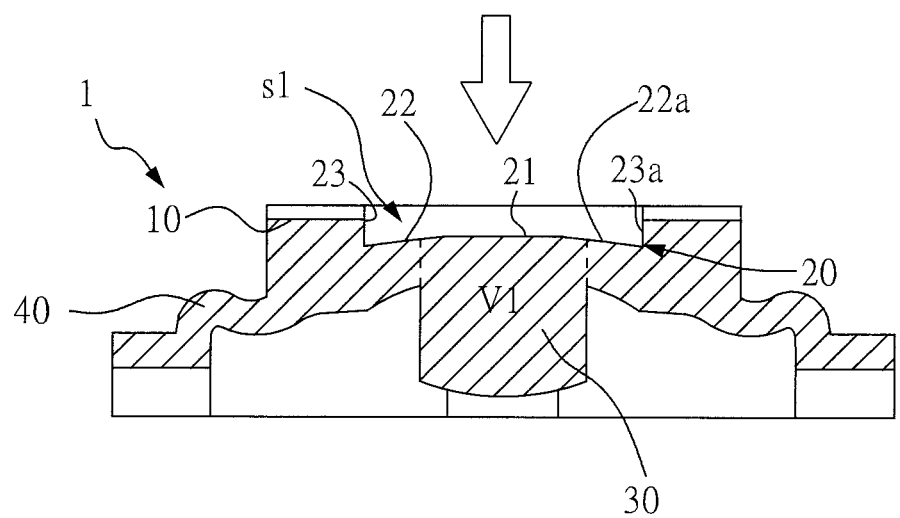
FIG. 3 is a cross-sectional view showing a resilient element deformed by an external force according to an embodiment of the present invention.
Figure 4:
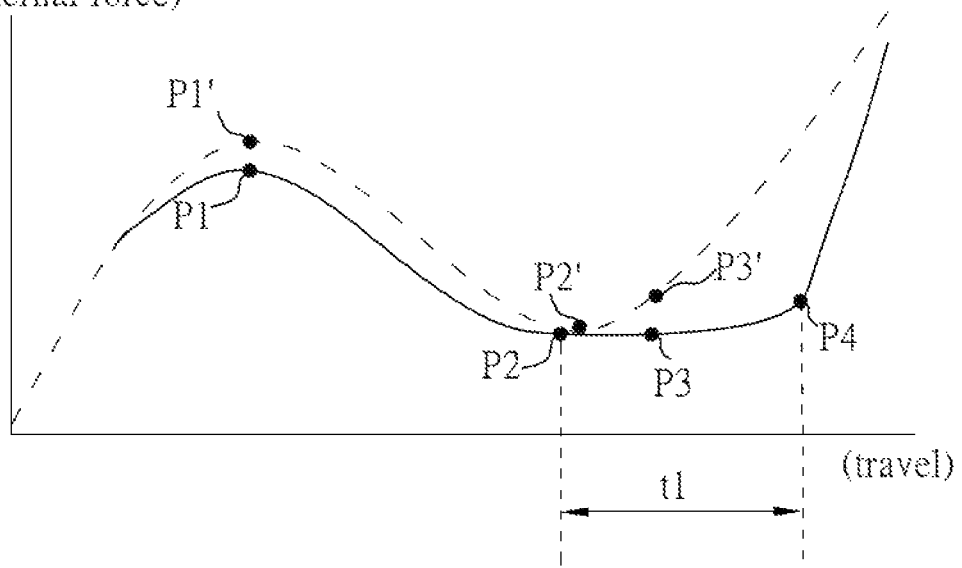
FIG. 4 shows an external force curve for a resilient element according to an embodiment of the present invention.

As shown in FIG. 2 and FIG. 3, in the present embodiment, the conducting post 30 has a post volume V1, and the scope of the post volume V1 is defined here as the part marked by dotted lines in FIG. 2 and FIG. 3. When the resilient element 1 is pressed, at least a portion of the post volume V1 enters the accommodating space s1 such that the recovery stroke of the resilient element 1 after the contact point (P3) produces a soft landing effect, thereby providing the user with a comfortable percussion feel (as shown in FIG. 4). It should be noted here that in order for the accommodating space s1 to accommodate the post volume V1 when the resilient element 1 is pressed, the accommodating volume of the accommodating space s1 needs to be greater than the post volume V1.

As shown in FIG. 2, in the present embodiment, the dent portion 20 further includes a first bottom surface 21, second inclined surfaces 22, 22a, and side walls 23, 23a. Specifically, the two ends of the first bottom surface 21 are respectively connected to the second inclined surfaces 22, 22a and the first bottom surface 21 has a width W. An end of the second inclined surface 22 which is not connected to the first bottom surface 21 is connected to the side wall 23, and an end of the second inclined surface 22a which is not connected to a first plane 21 is connected to the side wall 23a. In the present embodiment, the accommodating space s1 of the dent portion 20 is defined here as the space formed by the first bottom surface 21, the second inclined surfaces 22, 22a, and the side walls 23, 23a, but the present invention is not limited to the above embodiment. It should be specifically noted here that the accommodating space s1 of the dent portion 20 may also be defined as the space formed by the first bottom surface 21 and the second inclined surfaces 22, 22a. Furthermore, in the embodiment, the second inclined surfaces 22, 22a and the side walls 23, 23a are continuous surfaces, but the present invention is not limited thereto. They may also be discontinuous surfaces.

As shown in FIG. 2, the dent portion 20 has a first width W1, wherein the first width W1 is the distance between the side walls 23 and 23a. The conducting post 30 has a second width W2. The center line of the dent portion 20 overlaps with the center line of the conducting post 30. The first width W1 is greater than or equal to the second width W2 and the second width W2 is greater than the width (W) of the first bottom surface. Also, in the present embodiment, the second width W2 is 60% of the first width W1 so that when the resilient element 1 is pressed, the accommodating space s1 of the dent portion 20 accommodates a portion of the post volume V1 in the conducting post 30 (as shown in FIG. 3).

It should be noted here that, to accommodate a portion of the post volume V1, the first bottom surface 21 and the second inclined surface 22 have an included angle θ, wherein the included angle θ ranges from 110° to 170°. In addition, in order for the resilient element 1 to have a stable return force after being pressed, in the present embodiment, the first inclined surface 50 is parallel to the second inclined surface 22 so as to increase the service life of the resilient element 1 and the keyboard structure 100 of the present invention.

The difference between the effect of the resilient element 1 of the present invention and the prior art is illustrated in FIG. 4. As shown in FIG. 4, the dashed lines formed by P1', P2', and P3' are external force stroke curves of the existing resilient element, and the solid lines formed by P1, P2, P3, and P4 are the external force stroke curves of the resilient element 1 of the present invention. P1' and P1 are peak points, and the side wall 40 will begin to bend when the resilient element 1 is pressed downward from this point (as shown in FIG. 3). P2' and P2 are the bottom points. At this time, the resilient element 1 is close to the base plate. P3' and P3 are the fire/contact points, which are commonly known as the key-in points. At this time, the input signal of the keyboard will enter the computer system. P4 is the bottom end point unique to the resilient element 1 of the present invention, and the existing resilient element does not have this point.

As shown in FIG. 4, after the bottom points (P2' and P2), the resilience slope of the existing resilient element is significantly greater than that of the resilient element 1 of the present invention because the accommodating space s1 of the dent portion 20 can still accommodate the post volume V1 after the resilient element 1 of the present invention is at the bottom point (P2). Consequently, the stroke of the resilient element 1 close to the bottom becomes longer, i.e., the stroke t1 as shown in FIG. 3, such that the resilient element 1 of the present invention can provide the user with a percussion feel with increased comfort. In other words, as shown in FIG. 3 and FIG. 4, when the resilient element 1 of the present invention is pressed, the communicating space s1 of the dent portion 20 provides a buffer space for the post volume V1 of the conducting post 30 such that the stroke of the resilient element 1 close to the bottom becomes longer, resulting in the soft landing effect.

Referring again to FIG. 1B, to enhance the exhaust effect of the resilient element 1 and the keyboard structure 100 of the present invention, the resilient element 1 of the present invention further includes a first vent hole 60 and a second vent hole 70, wherein the first vent hole 60 is disposed on the top surface 10 and the second vent hole 70 is disposed on one side of the side wall 40 not connected with the top surface 10. It should be noted here that, in the present embodiment, the number of the first vent holes 60 is two, and the number of the second vent holes 70 is four, but the numbers of the first vent hole 60 and the second vent hole 70 are not particularly limited, as long as the exhaust can be vented to reduce the noise generated by the user when the user presses the keyboard structure 100.

As described above, when the resilient element 1 and the keyboard structure 100 of the present invention are pressed, the buffer space provided by the accommodating space s1 of the dent portion 20 to the post volume V1 of the conducting post 30 produces the soft landing effect of the resilient element 1 in the stroke after the contact point (P3). This provides the user with a comfortable percussion feel.

It should be noted that the embodiment of the present invention described above is only illustrative and that modifications can be made to the design without departing from the scope of the invention as defined solely by the appended claims.

What is claimed is:

1. A resilient element, used for a keyboard structure, wherein the keyboard structure comprises a base plate, the resilient element comprising:
   a top surface;
   a dent portion, which is located on the top surface, having an accommodating space, second inclined surfaces and a first bottom surface, wherein the first bottom surface starts at one of the second inclined surfaces and extends to another of the second inclined surfaces; and
   a conducting post, which is located beneath the dent portion, having a post volume and a second width, wherein a width of the first bottom surface is smaller than the second width and when the resilient element is pressed, at least a portion of the post volume enters the accommodating space for increasing a stroke of the resilient element close to the base plate and allowing the resilient element to reach a bottom end point by completing a stroke after passing a contact point.

2. The resilient element as claimed in claim 1, wherein the dent portion has a first width, and the first width is greater than or equal to the second width.

3. The resilient element as claimed in claim 1, wherein the accommodating space has an accommodating volume and the accommodating volume is greater than the post volume.

4. The resilient element as claimed in claim 3, wherein the resilient element further includes a side wall and a first inclined surface, the conducting post is located in an accommodating space formed between the top surface and the side wall, and the first inclined surface is located in the accommodating space between the conducting post and the side wall.

5. The resilient element as claimed in claim 4, wherein the first inclined surface is parallel to the second inclined surface.

6. The resilient element as claimed in claim 4, wherein the side wall includes at least a second vent hole which is located on a side of the side wall not connected to the top surface.

7. The resilient element as claimed in claim 1, wherein the first bottom surface and the second inclined surface have an included angle ranging from 110° to 170°.

8. The resilient element as claimed in claim 7, wherein the accommodating space is the space formed by the second inclined surface and the first bottom surface.

9. The resilient element as claimed in claim 1, wherein the resilient element includes at least a first vent hole located on the top surface.

10. A keyboard structure, comprising:
   a key cap;
   a base plate;
   a resilient element located between the key cap and the base plate, comprising:
      a top surface;
      a dent portion, which is located on the top surface, having an accommodating space, second inclined surfaces and a first bottom surface, wherein the first bottom surface starts at one of the second inclined surfaces and extends to another of the second inclined surfaces; and
      a conducting post, which is located beneath the dent portion, having a post volume and a second width, wherein a width of the first bottom surface is smaller than the second width and when the resilient element is pressed, at least a portion of the post volume enters the accommodating space for increasing a stroke of the resilient element close to the base plate and allowing the resilient element to reach a bottom end point by completing a stroke after passing a contact point.

11. The keyboard structure as claimed in claim 10, wherein the dent portion has a first width, and the first width is greater than or equal to the second width.

12. The keyboard structure as claimed in claim 10, wherein the accommodating space has an accommodating volume, and the accommodating volume is greater than the post volume.

13. The keyboard structure as claimed in claim 12, wherein the resilient element further includes a side wall and a first inclined surface, the conducting post is located in an accommodating space formed between the top surface and the side wall, and the first inclined surface is located in the accommodating space between the conducting post and the side wall.

14. The keyboard structure as claimed in claim 13, wherein the first inclined surface is parallel to the second inclined surface.

15. The keyboard structure as claimed in claim 13, wherein the side wall includes at least a second vent hole which is located on a side of the side wall not connected to the top surface.

16. The keyboard structure as claimed in claim 10, wherein the first bottom surface and the second inclined surface have an included angle ranging from 110° to 170°.

17. The keyboard structure as claimed in claim 16, wherein the accommodating space is the space formed by the second inclined surface and the first bottom surface.

18. The keyboard structure as claimed in claim 10, wherein the resilient element includes at least a first vent hole located on the top surface.

\* \* \* \* \*